United States Patent
Robertson et al.

[11] Patent Number: 6,132,184
[45] Date of Patent: Oct. 17, 2000

[54] RESERVOIR APPARATUS FOR AN ELECTRONICALLY CONTROLLED ELECTRIC PUMP

[75] Inventors: James R. Robertson, Walled Lake, Mich.; Scott Thomas Parkhill, Pettysburg, Ohio; Tim M. Staton, Ypsilanti, Mich.

[73] Assignee: Ford Motor Company, Dearborn, Mich.

[21] Appl. No.: 09/186,566

[22] Filed: Nov. 5, 1998

[51] Int. Cl.$^7$ ..................................................... F04B 17/00
[52] U.S. Cl. .......................................... 417/410.3; 417/366
[58] Field of Search ........................... 417/410.1, 410.3, 417/366, 367, 373

[56] References Cited

U.S. PATENT DOCUMENTS

| | | | |
|---|---|---|---|
| 4,893,590 | 1/1990 | Kashimura et al. | 123/41.31 |
| 4,920,574 | 4/1990 | Yamamoto | 361/385 |
| 4,951,636 | 8/1990 | Tuckey et al. | 123/497 |
| 4,980,588 | 12/1990 | Ogawa | 370/68 D |
| 4,998,865 | 3/1991 | Nakanishi et al. | 417/366 |
| 5,038,741 | 8/1991 | Tuckey | 123/509 |
| 5,050,037 | 9/1991 | Yamamoto | 361/385 |
| 5,126,919 | 6/1992 | Yamamoto | 361/385 |
| 5,316,075 | 5/1994 | Quon et al. | 165/80.4 |
| 5,546,275 | 8/1996 | Moutrie et al. | 361/707 |
| 5,613,844 | 3/1997 | Tuckey et al. | 417/366 |

*Primary Examiner*—Timothy S. Thorpe
*Assistant Examiner*—Michael K. Gray
*Attorney, Agent, or Firm*—Leslie C. Hodges

[57] ABSTRACT

A reservoir apparatus for an electronically controlled electric pump includes a pump housing (22), constructed of thermally conductive material, the pump housing having a cup-shaped reservoir portion (160) adapted to surround a pump assembly (164) to maintain the pump assembly submerged in hydraulic fluid (162). The pump housing also includes a fluid inlet (166) and a fluid outlet (168) for communicating fluid from the pump assembly to a hydraulically actuated device, such as a steering gear. The pump housing (22) also includes a first module member portion (20) adapted to seal with a second module member (24) so as to form a control module. The first module member portion (20) being operative to transmit thermal energy from electronic components into the pump housing and the hydraulic fluid.

17 Claims, 3 Drawing Sheets

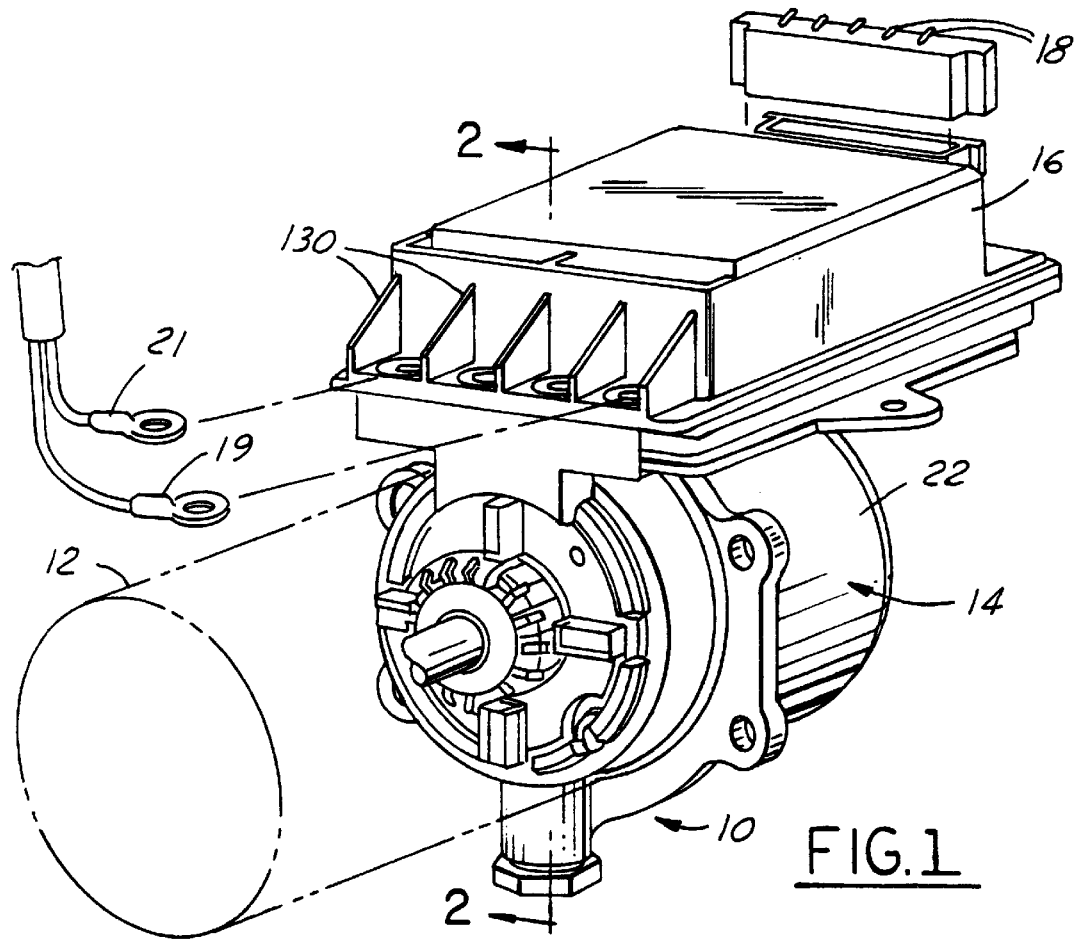
FIG.1
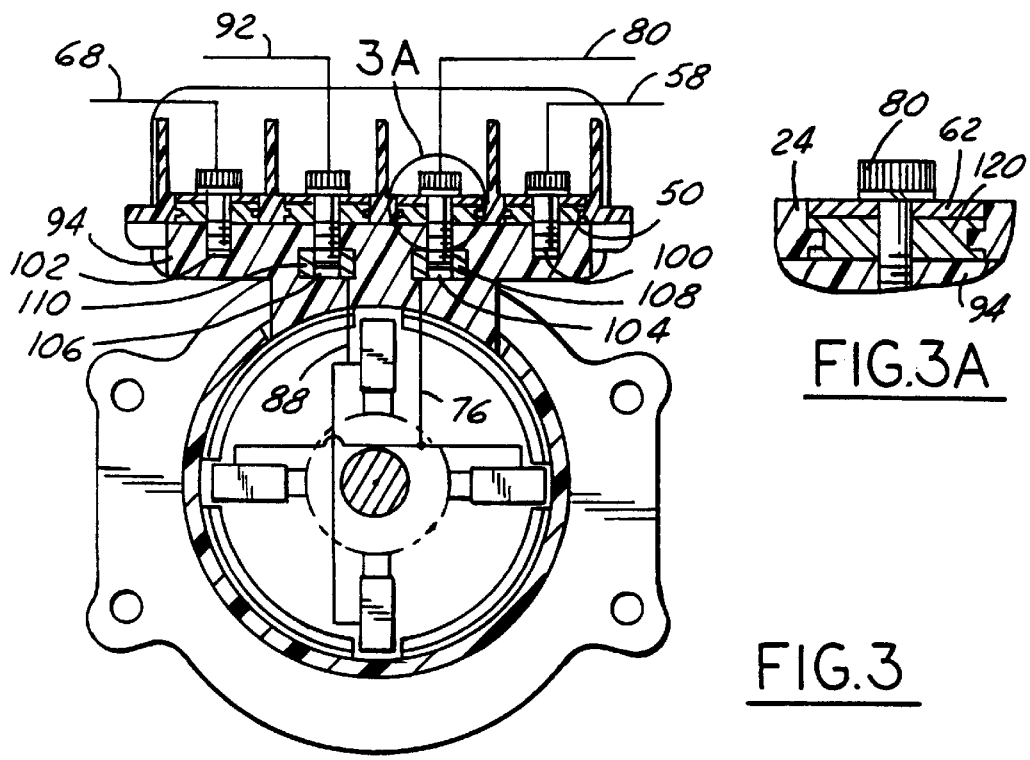
FIG.3
FIG.3A

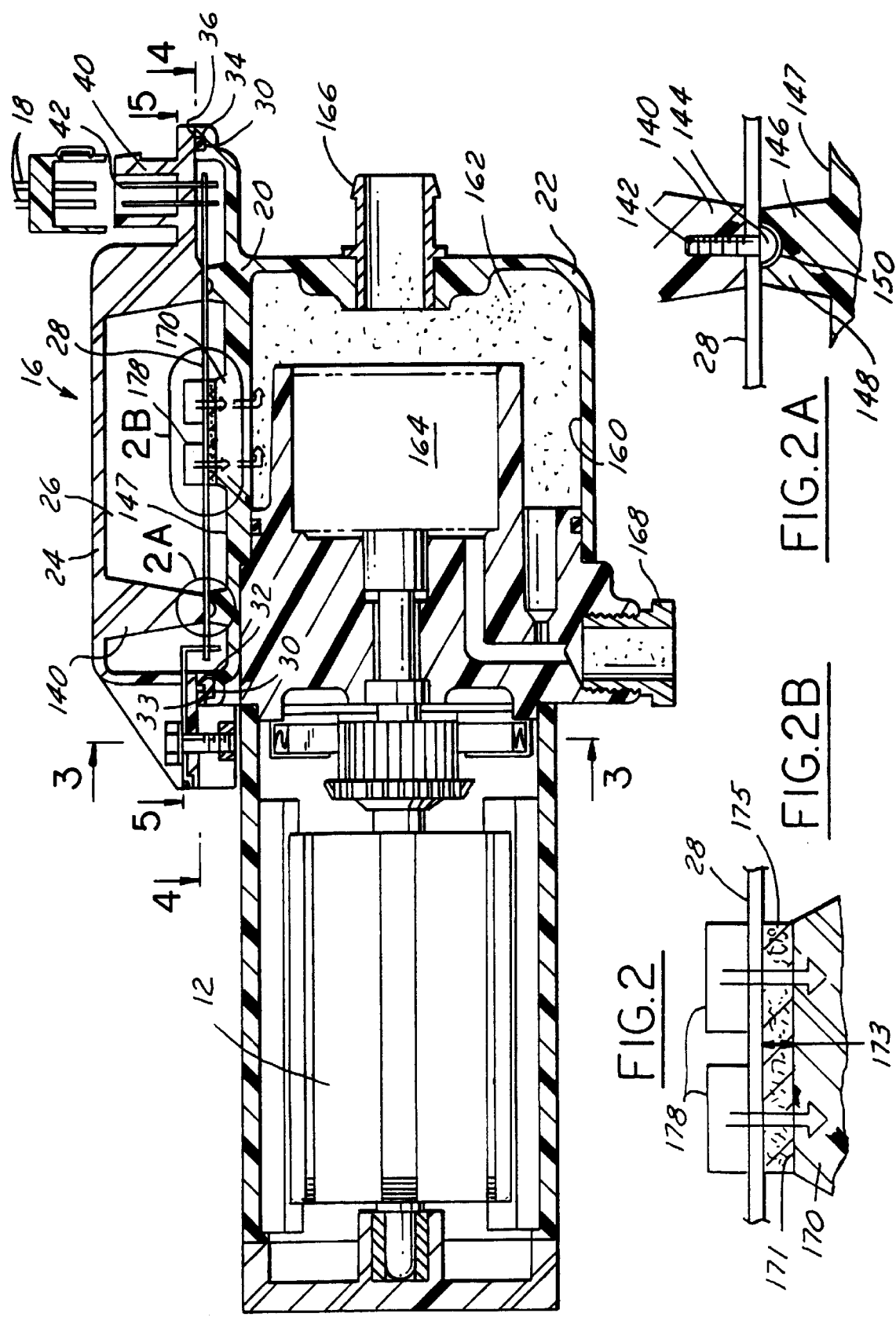

RESERVOIR APPARATUS FOR AN ELECTRONICALLY CONTROLLED ELECTRIC PUMP

BACKGROUND OF THE INVENTION

1. Field of the Invention

The present invention relates generally to hydraulic pumps. More particularly the present invention relates to an improved reservoir for use with an electrohydraulic pump resulting in a less expensive and simpler system than previously available.

2. Disclosure Information

It is well known to provide heat sinks for electronics modules utilizing diecast aluminum to dissipate heat generated by high power electronics components such as field effect transistors, voltage regulators, diodes, etc. The heat sinks may be internal to the control module or even integrated into the outer cover of the control module itself to provide exposure to external ambient air for enhanced cooling. The ability of these known heat sinks to dissipate heat is restrained by the temperature of the ambient air. In an automobile, the underhood temperatures can range considerably higher than the ambient temperature of the air surrounding the vehicle due to the operation of the internal combustion engine. Cooling an electronics module has thus presented a challenge for those applications where the control module is located in the harsh underhood environment.

It would therefore be desirable to provide a heat sink for a control module in an underhood environment capable of satisfactorily dissipating heat from the heat generating electronics components.

SUMMARY OF THE INVENTION

Therefore, the present invention provides an improvement over the previous heat sinks for control modules by integrating the heat sink with a fluid reservoir on an electrohydrualic pump allowing a lower cost and more package efficient unit than those previously known.

In accordance with the present invention, a reservoir apparatus for an electronically controlled electric pump includes a pump housing, constructed of thermally conductive material, the pump housing having a cup-shaped reservoir portion adapted to surround a pump assembly to maintain the pump assembly submerged in hydraulic fluid. The pump housing also includes a fluid inlet and a fluid outlet for communicating fluid from the pump assembly to a hydraulically actuated device, such as a steering gear. The pump housing also includes a first module member portion adapted to hermetically seal with a second housing member so as to form a control module. The first module member portion being operative to transmit thermal energy from electronic components into the pump housing and the hydraulic fluid.

It is an advantage of the present invention to provide an integrated reservoir/heat sink/control module member for an electronically controlled electric pump that allows simple, low cost manufacturing and packaging efficiencies heretofore unavailable for such applications.

BRIEF DESCRIPTION OF THE DRAWINGS

FIG. 1 is a perspective view of a control module and hydraulic pump assembly in accordance with the present invention.

FIG. 2 is a section view of a control module, electric motor and hydraulic pump assembly in accordance with the present invention.

FIG. 2A is an enlarged view taken from FIG. 2 showing a feature of the control module in accordance with the present invention.

FIG. 2B is an enlarged view taken from FIG. 2 showing a feature of the control module in accordance with the present invention.

FIG. 2C is an enlarged view taken from FIG. 2 showing a feature of the control module in accordance with the present invention.

FIG. 3 is a section view taken along lines 3—3 from FIG. 2 showing fasteners and power connections constructed in accordance with the present invention.

FIG. 3A is an enlarged view taken from FIG. 3 showing a feature of a fastener and power connections constructed in accordance with the present invention.

DETAILED DESCRIPTION OF THE PREFERRED EMBODIMENT

Figure 4:
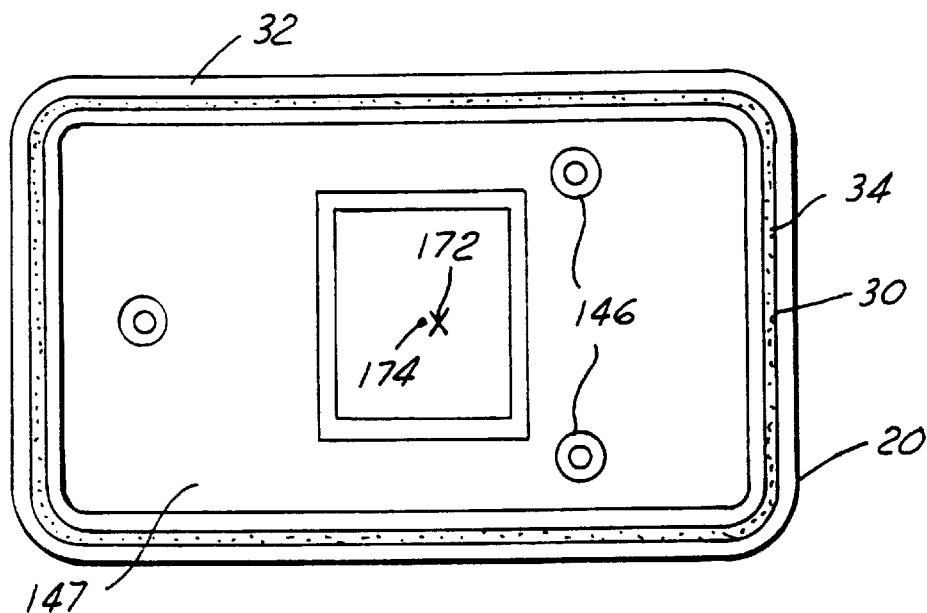
FIG. 4 is a plan view of a floor of a first module member portion constructed in accordance with the present invention.

Referring now to FIG. 1, an integrated power steering pump 10 is shown including an electric motor 12 for driving a hydraulic pump 14, which supplies pressurized hydraulic fluid to power steering gear (not shown). An integrated control module 16 commands the electric motor 12 through positive and negative power supply leads in response to control input signals received through a control signal wire set 18. While the present invention is being described with respect to a pump assembly for a power steering system, it should be recognized that the present invention is not so limited. The benefits of the present invention could be obtained if applied to any electrically driven pump mechanism.

Referring now to FIGS. 1 through 4, the control module 16 includes a first module member portion 20, which in the presently preferred embodiment is integrally cast with a portion of a pump housing 22. In particular, the first module member portion 20 is cast integrally with a pump reservoir 160, however, many of the benefits of the present invention can obtained by integrally casting the first module member portion 20 with any part of the pump housing, generally be defined as the exterior components of the electro-hydraulic pump assembly.

The control module 16 also includes a second module member 24 which matingly engages the first module member portion 20 forming a sealed interior 26 of the control module for containing a circuit board 28. Generally, an adhesive epoxy 33 will be located within a channel 30 such that it flows out onto a mating surface 32 of the lower module member portion 20 for sealingly engaging a mating surface 36 on the second module member. Alternatively, when desirable, the control module can be hermetically sealed by placing an elastomeric seal 34 in the channel 30 for engaging the mating surface 36 on the second module member.

Figure 5:
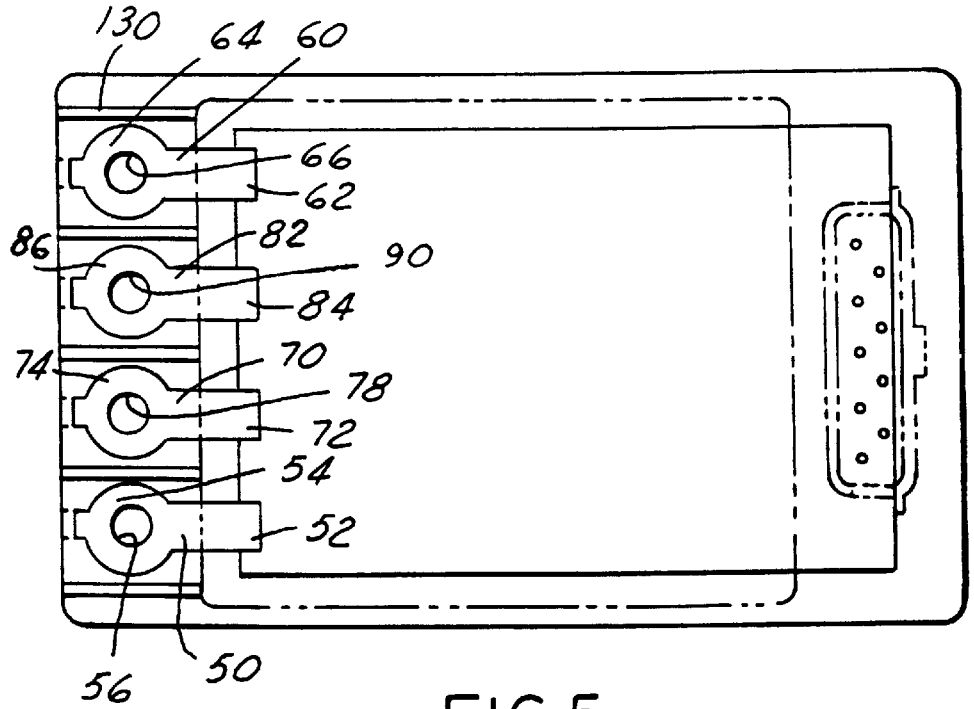
FIG. 5 is a bottom view of a circuit board disposed in a second module member in accordance with the present invention.

Referring now to FIGS. 2, 3 and 5, the second module member 24 includes an integrally molded control signal connector 40 of the type allowing quick release and attachment of the control signal wire set 18 to a set of control signal terminals 42 within the control signal connector 40. The control signal terminals 42 are conductively attached to the circuit board 28. The signals transmitted through the control signal wire set are characteristically low current signals providing the control circuit with operating parameters necessary for the control module to generate appropriate electric motor control signals.

The second module member 24 also includes a high power electrical connection, purposefully spaced apart from the control signal connect to minimize interference potentially generated at the high power electical connections. The high power electrical connections include a positive supply blade 50 integrally molded or stitched within the second module member 24 and having a first end 52 attached to the circuit board and a second end 54 extending outside of the control module for attachment to a positive supply lead 19. In the presently preferred embodiment, the second end of the positive supply blade includes a first aperture 56 for receiving a first threaded fastener 58 therethrough.

The high power electrical connections also include a negative supply blade 60 integrally molded or stitched within the second module member 24 and having a third end 62 attached to the circuit board and a fourth end 64 extending outside of the control module for attachment to a negative supply lead 21. In the presently preferred embodiment, the fourth end of the positive supply blade includes a second aperture 66 for receiving a second threaded fastener 68 therethrough.

In a conventional manner, well known to those skilled in the art, the control module 16 generates electronic motor control signals and distributes power to the electronic motor through the high power electrical connections using integrally molded or stitched positive and negative motor blades 70, 82. The positive motor blade 70 includes a fifth end 72 attached to the circuit board and a sixth end 74 extending outside of the control module for attachment to a positive motor lead 76. In the presently preferred embodiment, the sixth end 74 of the positive motor blade includes a third aperture 78 for receiving a third threaded fastener 80 therethrough. Similarly, the negative motor blade 82 includes a seventh end 84 attached to the circuit board and a eighth end 86 extending outside of the control module for attachment to a negative motor lead 88. In the presently preferred embodiment, the eighth end 86 of the negative motor blade includes a fourth aperture 90 for receiving a fourth threaded fastener 92 therethrough.

In the preferred embodiment, the first and second fasteners 58, 68 serve to conductively interconnect the positive and negative supply leads 19, 21 to the second and fourth ends 54, 64 of the positive and negative supply blades 50, 60, respectively. Additionally, by providing first and second threaded bores 100, 102 within a motor brush card 94, the first and second threaded fasteners 58, 68 can provide a clamping force necessary to seal the control module while also serving to attach the control module to the electric motor and/or pump assembly. The multiple functions served by these fasteners can result in considerable savings in both cost and manufacturing.

The brush card 94 of the presently preferred embodiment serves both as a mounting point for the control module as well as a power distribution device for the electrical motor. While a brush card for a motor utilizing brushes is illustrated, it should be readily apparent to those skilled in the art that the benefits of the present invention would equivalently apply to a brushless motor.

The brush card 94 includes first and second blind threaded bores 100, 102 for matingly receiving first and second threaded fasteners 58, 68. The brush card 94 also includes third and fourth threaded bores 104, 106 having disposed therein first and second threaded tubular contacts 108, 110, respectively, for receiving third and fourth threaded fasteners 80, 92. The third and fourth threaded fasteners establish electrically conductive communication between the positive and negative power blades 70, 82 and the positive and negative motor leads 76, 88, respectively. It has been determined that it is desirable to locate the positive and negative motor blades 70, 82 between the positive and negative supply blades 50, 60.

Referring now to FIGS. 3 and 3A, when threaded fasteners are selected to establish the clamping force for high power electrical connectors, the second module member 24 may be molded with metallic bushings 120 disposed beneath the external ends of various blades. The metallic bushings have been shown to permit consistent torque application during assembly with minimal relaxation of the clamping force generated by the threaded fasteners.

Referring back now to FIGS. 1, 2, and 5, the second module member also includes molded in upstanding vertical walls on either side of each of the fasteners. These upstanding vertical walls serve to isolate the conductive fasteners from outside interference and possible inadvertent electrical contact with other conductive objects. To serve this role, the upstanding walls preferably have a height equal to or greater than the installed height of the fasteners.

Referring now to FIGS. 2 and 2A, the second module member also includes molded in circuit board support members 140. In the preferred embodiment, there are at least three such support members 140 so that the planar circuit board can be positively supported. The circuit board is attached to the circuit board support members 140 by retaining screws 142 having semi-spherical drive heads 144. Three pillars 146 project upwards from a floor 147 of the first module member portion and the ends 148 of each of the pillars 146 include a circular depression 150 to receive the drive heads 144 without interference. In the embodiment using an epoxy sealer 33, as shown in FIG. 2, the height of the pillars controls the thickness of the epoxy sealer between surfaces 32, 36.

Referring now to FIGS. 2, 2B and 5, the preferred embodiment achieves enhanced control module cooling by integrally casting the first module member portion of the control module with a cup-shaped reservoir 160 on the pump housing 22 from a thermally conductive material, such as aluminum. The reservoir 160 provides a large surface area, both external for transferring heat to ambient air as well as internal for transferring heat to hydraulic fluid 162 contained therein. The reservoir 160 completely surrounds a pump assembly 164 so as to maintain the pump assembly 164 submerged in the hydraulic fluid 162. The pump assembly can be any type of rotary pump suitable for being driven by an electric motor. The Reservoir includes a fluid inlet 166 and a fluid outlet 168 for communicating fluid to and from a steering mechanism.

Additional heat transfer can be achieved by providing a heat transfer platform 170 on the floor of the first module member portion. The heat transfer platform includes a top surface 171 disposed a predetermined height above the floor 147. Depending on the construction of the circuit board, the top surface may be positioned so as to be directly in contact with the circuit board when installed, or slightly below the circuit board forming a gap 173 to be filled by an electronically insulative and thermally conductive pad 175. In practice, the gap 173 is controlled by setting the height of the pillars 146 relative to the height of the heat transfer platform.

In the preferred embodiment the pad is formed by applying a liquid compound of silicon filled with a thermally conductive filler, such as is commercially available from Dow Chemical as silicone #4168 or #4174. Of course this fluid cures to form a resilient pad after assembly, providing additional vibration damping for the circuit board.

Preferably, the heat transfer platform 170 has a first center 172 that can be positioned substantially coincident with a second center 174 created by the at least three pillars 146 in the plan view. This allows an even application of pressure between the circuit board and the heat transfer platform 170 to further enhance thermal conductivity. It is further desirable to locate electrical components 178 generating the greatest heat on the circuit board as close to the heat transfer platform as possible for a given design to further enhance thermal efficiency.

Various modifications and variations will no doubt occur to those skilled in the art to which this invention pertains. Those and all other variations which basically rely on the teachings by which this disclosure has advanced the art are properly considered within the scope of this invention as defined by the appended claims.

What is claimed is:

1. A reservoir apparatus for an electronically controlled electric pump, said reservoir apparatus comprising:
   a pump housing constructed of thermally conductive material;
   said pump housing having a cup-shaped reservoir portion adapted to sealably and enclosably surround a pump assembly and maintain said pump assembly submerged in hydraulic fluid;
   a fluid inlet in said pump housing; and
   a fluid outlet in said pump housing;
   said pump housing also having a first module member portion adapted to seal with a second housing member so as to form a control module for housing a circuit board populated with electronic components;
   said first module member portion being operative to transmit thermal energy from said electronic components into said pump housing and from said pump housing into said hydraulic fluid.

2. The reservoir apparatus as claimed in claim 1, wherein said first module member portion of said pump housing further comprises a plurality of pillars projecting toward said second housing member from a floor of said first module member portion, each of said plurality of said pillars having a circular depression formed in an end thereof, said circular depression being adapted to receive and align said second housing member relative to said first housing member portion during assembly of said control module.

3. The reservoir apparatus as claimed in claim 1, wherein said first module member portion of said pump housing further comprises at least one heat transfer platform projecting toward said second housing member from a floor of said first module member portion so as to be within a predetermined distance from said circuit board when said control module is finally assembled.

4. The reservoir apparatus as claimed in claim 3, further comprising a pad disposed on a top surface of said heat transfer platform, said pad being thermally conductive and electrically insulative.

5. The reservoir apparatus as claimed in claim 4, wherein said pad is constructed so as to be capable of flowing during initial assembly of said control module so as to allow said pad to fill a gap between said circuit board and said top surface of said heat transfer platform.

6. The reservoir apparatus as claimed in claim 1, wherein said first module member portion of said pump housing further comprises at least three pillars projecting toward said second housing member from a floor of said first module member portion, each of said at least three pillars having a circular depression formed in an end thereof, said circular depression being adapted to receive a partially-spherical fastener head so as to align said second housing member relative to said first housing member portion during assembly of said control module.

7. The reservoir apparatus as claimed in claim 2, wherein said first module member portion of said pump housing further comprises at least one heat transfer platform projecting toward said second housing member from a floor of said first module member portion so as to be within a predetermined distance from said circuit board when said control module is finally assembled, said at least one heat transfer platform having a first center, said first center being positioned on said floor of said first module member substantially coincident with a second center formed by said plurality of pillars.

8. A reservoir apparatus for an electronically controlled electric pump, said reservoir apparatus comprising:
   a pump housing constructed of thermally conductive material;
   said pump housing having a cup-shaped reservoir portion adapted to surround a pump assembly and maintain said pump assembly submerged in hydraulic fluid;
   a fluid inlet in said pump housing; and
   a fluid outlet in said pump housing;
   said pump housing also having a first module member portion adapted to seal with a second housing member so as to form a control module for housing a circuit board populated with electronic components, said first module member portion having at least one heat transfer platform projecting toward said second housing member from a floor of said first module member portion to a predetermined distance from said circuit board when said control module is finally assembled;
   said reservoir apparatus being operative to transmit thermal energy from said electronic components into said pump housing and from said pump housing into said hydraulic fluid.

9. The reservoir apparatus as claimed in claim 8, wherein said first module member portion of said pump housing further comprises a plurality of pillars projecting toward said second housing member from said floor of said first module member portion, each of said plurality of said pillars having a circular depression formed in an end thereof, said circular depression being adapted to receive and align said second housing member relative to said first housing member portion during assembly of said control module.

10. The reservoir apparatus as claimed in claim 8, further comprising a pad disposed on a top surface of said heat transfer platform, said pad being thermally conductive and electrically insulative.

11. The reservoir apparatus as claimed in claim 10, wherein said pad is further characterized by being capable of flowing during initial assembly of said control module so as to allow said pad to fill a gap between said circuit board and said top surface of said heat transfer platform.

12. The reservoir apparatus as claimed in claim 8, wherein said first module member portion of said pump housing further comprises at least three pillars projecting toward said second housing member from said floor of said first module member portion, each of said at least three pillars having a circular depression formed in an end thereof, said circular depression being adapted to receive a partially-spherical fastener head so as to align said second housing member relative to said first housing member portion during assembly of said control module.

13. A reservoir apparatus for an electronically controlled electric pump, said reservoir apparatus comprising:

a pump housing constructed of thermally conductive material;

said pump housing having a cup-shaped reservoir portion adapted to surround a pump assembly and maintain said pump assembly submerged in hydraulic fluid;

a fluid inlet in said pump housing; and a fluid outlet in said pump housing;

said pump housing also having a first module member portion adapted to seal with a second housing member so as to form a control module for housing a circuit board populated with electronic components;

said first module member portion having at least one heat transfer platform projecting toward said second housing member from a floor of said first module member portion to a predetermined distance from said circuit board when said control module is finally assembled;

said first module member portion of said pump housing having a plurality of pillars projecting toward said second housing member from said floor of said first module member portion, each of said plurality of said pillars having a circular depression formed in an end thereof, said circular depression being adapted to receive and align said second housing member relative to said first housing member portion during assembly of said control module;

whereby said reservoir apparatus is operative to transmit thermal energy from said electronic components into said pump housing and from said pump housing into said hydraulic fluid.

14. The reservoir apparatus as claimed in claim 13, wherein said first module member portion of said pump housing further comprises a plurality of pillars projecting toward said second housing member from a floor of said first module member portion, each of said plurality of said pillars having a circular depression formed in an end thereof, said circular depression being adapted to receive and align said second housing member relative to said first housing member portion during assembly of said control module.

15. The reservoir apparatus as claimed in claim 13, further comprising a pad disposed on a top surface of said heat transfer platform, said pad being thermally conductive and electrically insulative.

16. The reservoir apparatus as claimed in claim 15, wherein said pad is further characterized by being capable of flowing during initial assembly of said control module so as to allow said pad to fill a gap between said circuit board and said top surface of said heat transfer platform.

17. The reservoir apparatus as claimed in claim 13, wherein said first module member portion of said pump housing further comprises at least three pillars projecting toward said second housing member from a floor of said first module member portion, each of said at least three pillars having a circular depression formed in an end thereof, said circular depression being adapted to receive a partially-spherical fastener head so as to align said second housing member relative to said first housing member portion during assembly of said control module.

* * * * *